(12) United States Patent
Rubin

(10) Patent No.: US 6,223,694 B1
(45) Date of Patent: May 1, 2001

(54) ERGONOMIC ANIMAL LEASH

(75) Inventor: Burt Rubin, New York, NY (US)

(73) Assignee: Dandl Co., New York, NY (US)

( * ) Notice: Subject to any disclaimer, the term of this patent is extended or adjusted under 35 U.S.C. 154(b) by 0 days.

(21) Appl. No.: 09/334,231

(22) Filed: Jun. 16, 1999

(51) Int. Cl.⁷ .................................................. A01K 27/00
(52) U.S. Cl. ............................................................ 119/795
(58) Field of Search .................... 119/769, 792, 119/793, 795, 797, 798

(56) References Cited

U.S. PATENT DOCUMENTS

| | | |
|---|---|---|
| D. 341,682 | 11/1993 | Musetti . |
| 1,509,781 * | 9/1924 | Roth ..................... 119/795 |
| 3,172,394 * | 3/1965 | Taylor ................... 119/769 |
| 3,512,223 * | 5/1970 | Willinger ........... 119/793 X |
| 3,603,295 | 9/1971 | Shuman . |
| 3,867,905 | 2/1975 | Vail, Jr. . |
| 4,019,463 * | 4/1977 | Kitchen ................. 119/793 |
| 4,328,767 | 5/1982 | Peterson . |
| 4,974,549 | 12/1990 | Gordon . |
| 5,351,654 * | 10/1994 | Fuentes ................. 119/795 |
| 5,363,810 | 11/1994 | Kraus . |
| 5,632,234 * | 5/1997 | Parker ................... 119/795 |
| 5,649,504 | 7/1997 | Culp . |
| 5,791,295 * | 8/1998 | Schmid et al. ........ 119/793 |

FOREIGN PATENT DOCUMENTS

| | | | |
|---|---|---|---|
| 768436 * | 8/1934 | (FR) ..................... 119/793 |
| 1228581 * | 4/1971 | (GB) ..................... 119/793 |

* cited by examiner

*Primary Examiner*—Thomas Price
(74) *Attorney, Agent, or Firm*—Merchant & Gould P.C.

(57) ABSTRACT

Disclosed is an ergonomic animal leash intended for animals such as dogs, horses and circus animals. The leash has a gripping handle that permits a user to grasp the first or upper handle with substantially more strength than that afforded by typical leashes. Further, the animal leash also has a second gripping handle which permits the user to quickly and safely closer control over the tethered animal.

9 Claims, 6 Drawing Sheets

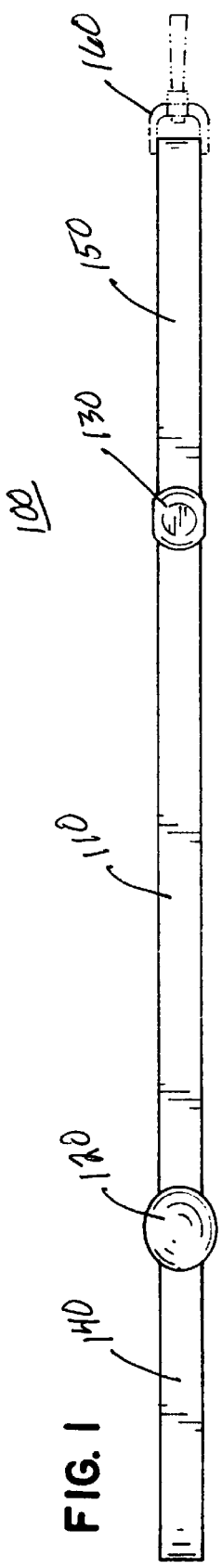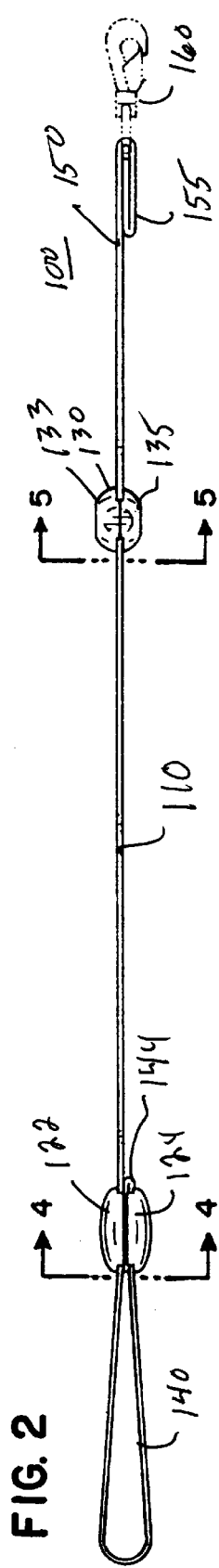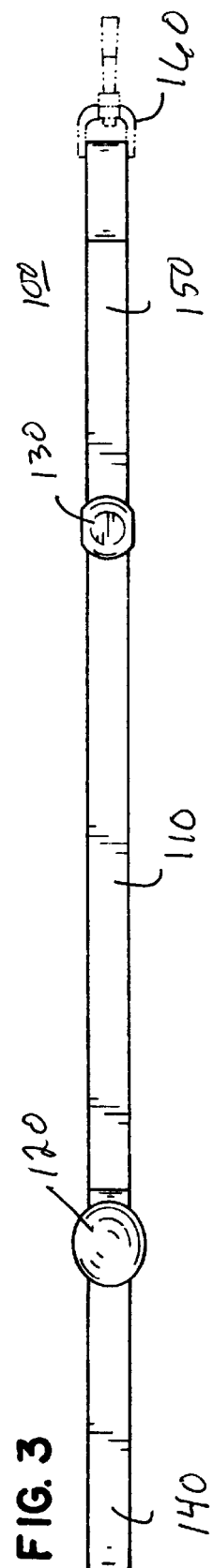
FIG. 1   FIG. 2   FIG. 3   FIG. 4   FIG. 5

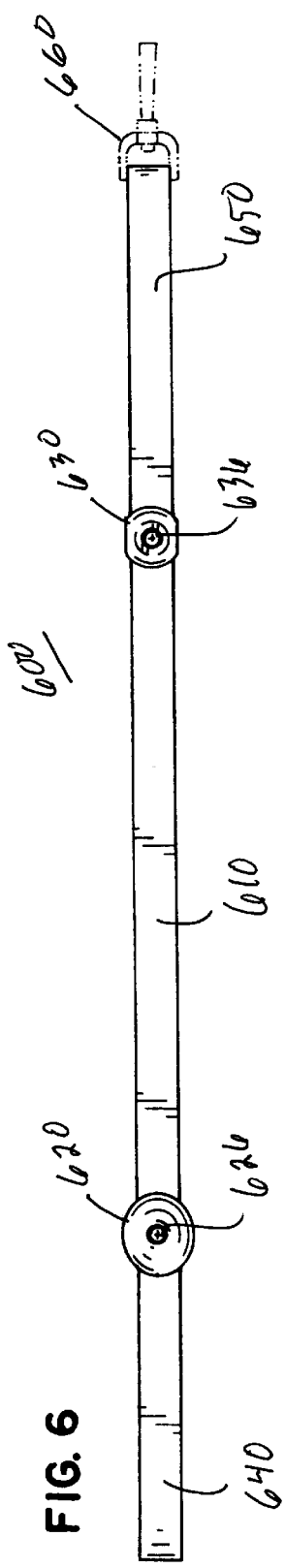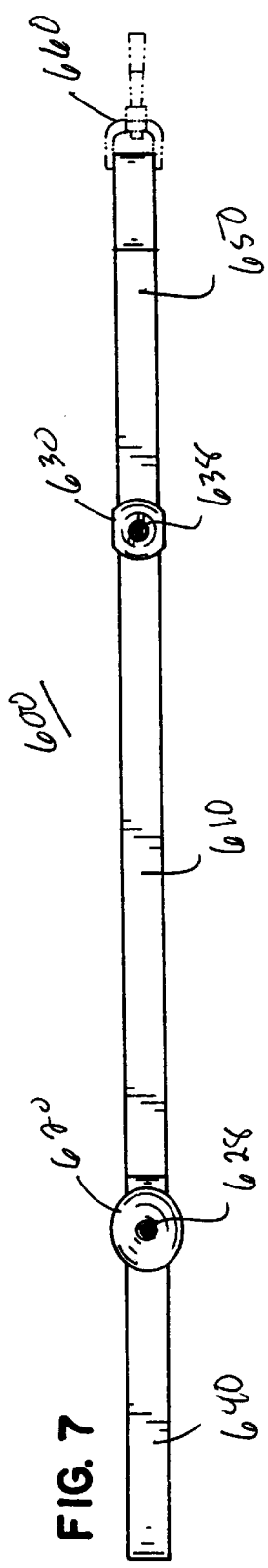

ERGONOMIC ANIMAL LEASH

FIELD OF THE INVENTION

The invention relates generally to animal leashes and relates more specifically to animal leashes which have been designed in an ergonomic fashion. More specifically, the invention relates to animal leashes that feature one or more ergonomic gripping handles.

BACKGROUND OF THE INVENTION

Many dog leashes have only one looped handle for restricting the animal's movement. This design forces the handler to seek an additional grip when closer, tighter or firmer control of the animal is required. This can mean grasping the leash between thumb and forefinger, and for stronger control, wrapping the leash several times around the hand. With the first method, the animal may be able to pull away because of slippage and inefficient gripping, resulting in significant rope burn or even restriction of the hand as the animal pulls. Wrapping the hand takes additional time and restricts the flexibility and movement of the hand.

Alternatively, it may be necessary to exert closer control over the animal in certain circumstances. Examples include walking an animal near traffic, in close quarters such as elevators, or in crowds of people. Typically, a second grip is accomplished by grasping the far end of the leash (nearest the animal) between thumb and forefinger. As noted, this method usually fails to provide sufficient gripping strength. Further, the leash can be difficult to grasp and grip quickly in this manner.

One solution was disclosed by Kraus, U.S. Pat. No. 5,11363,810, who described a two looped flexible animal control tether. Kraus taught a dog leash in which a second loop is added near the animal attachment point. While this second flexible loop provided an improved way to exert close control over an animal, it nevertheless is difficult to grasp in a short period of time, and is not an efficient or ergonomically effective grip. The user typically would not be touching the second, close control loop unless necessary. If immediate close control is required, the user will fumble with properly grasping the second loop.

Loops such as those described by Kraus are typically held by placing one's hand through the loop so that the leash dangles from the user's wrist. If firmer control is needed, the user can then grasp the leash just below the loop handle. However, the only way to grasp the leash is between thumb and forefinger, which exerts only a limited amount of holding power, and slippage occurs. Typically, if the loop itself is held, only the first two finger joints are used. This is relatively weak compared to a full hand.

Consequently, a need remains for an animal leash which has a first handle which is easily and quickly grasped for the firmest control, and a second handle which can be easily and quickly grasped if close control is necessary. Preferably, the first and second handles are designed in an ergonomic fashion, allowing the user to surround the handle completely with the hand in the strongest fully closed position.

SUMMARY OF THE INVENTION

Accordingly, the invention is found in an animal leash which has a first end having a typical loop and further including a first ergonomic gripping handle and for close control a second end including a second ergonomic gripping handle. The ergonomic animal leash of the invention permits a user to comfortably hold a leash in the normal manner, yet quickly and safely grasp the first gripping handle when additional strength is required. If close control is required, the user can quickly and safely grasp the second gripping handle.

Specifically, the invention is found in an ergonomic animal leash having an elongate body including a strap. The leash has a first end having a loop handle and a first ergonomic gripping handle; and a second end having a second ergonomic gripping handle and a clip suitable for attaching to an animal collar. The first ergonomic gripping handle and the second ergonomic gripping handle permit a user to quickly and easily grasp the leash with the strongest possible hold, surrounding the object handle with the most natural and strongest grip.

BRIEF DESCRIPTION OF THE DRAWINGS

FIG. 1 is a top plan view of a first embodiment of the ergonomic animal leash of the invention.

FIG. 2 is a side elevation of the leash shown in FIG. 1, showing how the strap material forms the first loop and how the clamshell gripping handles are attached.

FIG. 3 is a bottom plan view of the leash shown in FIG. 1.

FIG. 4 is a cross-sectional view of the first or upper gripping handle, taken alone the 4—4 line of FIG. 2.

FIG. 5 is a cross-sectional view of the second or lower gripping handle, taken along the 5—5 line of FIG. 2.

FIG. 6 is a top plan view of a second embodiment of the ergonomic animal leash of the invention.

FIG. 7 is a bottom plan view of the animal leash shown in FIG. 6.

DETAILED DESCRIPTION OF THE PREFERRED EMBODIMENTS

Figure 8:
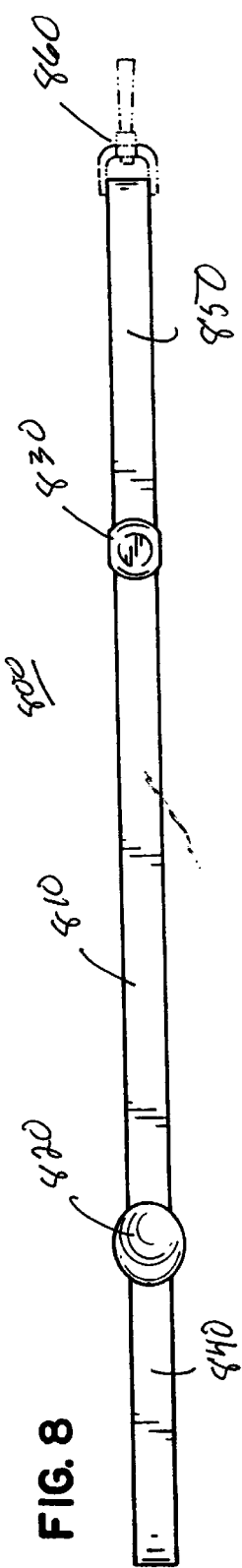
FIG. 8 is a top plan view of a third embodiment of the ergonomic animal leash of the invention.

The invention is best understood within the context of the drawings, in which similar reference numbers are used to denote similar objects or structures in multiple drawings. FIGS. 1 through 5 illustrate a first embodiment of the invention. FIG. 1 shows an animal leash 100 which has a strap 110, a first loop 140 and a first ergonomic gripping handle 120. The strap 110 also has a second ergonomic gripping handle 130, a clip 160 and an intervening strap portion 150. The strap 110 can be made from a variety of materials known to those of skill in the art. Typically, the strap 110 is made of nylon or leather, although other materials are also possible. Typically, strap 110 is flat, although round, rope-like leashes are also possible. While dog leashes can vary substantially in length, the animal leash 100 of the invention is preferably 4 to 12 feet in length, more preferably 4 to 6 feet in length.

Construction of the animal leash 100 can be described using FIG. 2, which is a side elevation view of one embodiment of the invention. The first end of the animal leash 100 (the end nearest the user) has a loop 140 which is formed from a portion of strap 110. The loop 140 terminates in end 144, which can be held in place by first gripping handle 120. Preferably, however, the loop 140 is formed by securing end 144 to the strap 110 prior to attaching the gripping handle 120. This can be accomplished via sewing or by the use of adhesives. In this instance, the first gripping handle 120 can be slipped over the completed loop 140. The gripping handle 120 also could be used to secure the loop, thereby obviating the need for adhesives or sewing or the like when forming the loop 140.

First gripping handle 120 has an upper portion 122 and a lower portion 124. In this embodiment, upper portion 122 and lower portion 124 are secured to each other and to the strap 110 via a snap connection or rivet between them (not illustrated).

Alternatively, upper portion 122 and lower portion 124 can be attached to each other by an adhesive. Each portion 122, 124 of the first gripping handle 120 can be made from wood or a variety of thermoplastic or thermosetting plastics. The first gripping handle 120 can also be made from softer, partially compliant materials such as rubber for improved user comfort. Alternately, the first gripping handle 120 can also be made from a firm material which is then covered with a pliant material. The first gripping handle 120 can be either a solid shape or a shell. Obviously, the securement method may vary depending on the material and shape of first gripping handle 120. The upper and lower portions 122 and 124 may be identical and therefore reversible clamshells for efficient manufacture, allowing for reduced tooling and manufacturing costs.

In a similar fashion, lower or second gripping handle 130 is also seen as having two portions, an upper portion 133 and a lower portion 135. As with the first gripping handle 120, the second gripping handle can be secured to the strap 110 via a snap connection or by the use of adhesives. The lower gripping handle 130 is located about 8 to 24 inches, preferably about 10 inches, from the end of the leash. The lower gripping handle 130 can be either solid or hollow, and can be made from a variety of materials including wood and thermoplastic or thermosetting plastics. As with the upper gripping handle 120, lower gripping handle can be firm or pliant. The upper and lower portions 133 and 135 may be identical and therefore reversible clamshells for efficient manufacture, allowing for reduced tooling and manufacturing costs.

In the embodiments shown in the figures, second gripping handle 130 is substantially smaller then first gripping handle 120. This is possible because the second gripping handle 130 is much closer to the animal. Consequently, grasping the second gripping handle means that the animal has a smaller range of motion and therefore can not exert as much force. In contrast, the animal can exert substantially more force if the user only holds onto the first gripping handle 120. The second gripping handle 130 can, however, be the same size as first gripping handle 120. This would be beneficial in controlling manufacturing costs, for example.

The Figures show a first gripping handle 120 and a second gripping handle 130 which are fixed in position. As contemplated by the invention, however, these gripping handles 120 and 130 can also be moveable. This could allow for the user to make adjustments to better conform the animal leash 100 to their preferences. For example, one may wish to move second gripping handle 130 even closer to the animal attachment point, for even closer control. Alternately, either the first gripping handle 120 or the second gripping handle 130 could be moved towards the center of animal leash 100, thereby creating an intermediate control position. This can be accomplished, for example, by providing handles which engage the leash with a releasable friction device that would allow the handle to slide along the leash to a desired location. Further, the handles could be removable from the leash to be reset at different locations as desired.

As shown in the Figures, the gripping handles 120 and 130 can be substantially round or substantially oval to fit comfortably inside the hand. Substantially round means that the component in question is predominantly round but may have portions which are flattened or otherwise modified. This can be seen in FIGS. 1 and 2, in which second gripping handle 130 is seen as having a predominantly round shape which has been flattened on one or more sides. Alternatively, second gripping handle 130 could be completely round. Substantially oval means that the component in question is predominantly oval, but may be partially flattened or lengthened in one dimension. This is exhibited in FIGS. 1 and 2, in which first gripping handle is seen as having an essentially round shape which has been elongated in the direction of the length of the strap 110, i.e., like a flattened egg.

The first gripping handle 120 can range in size, depending on the intended end user of the animal leash. As noted, the first gripping handle 120 can be partially flattened or lengthened in one dimension. As a result, its longest dimension (preferably parallel to the long axis of the strap 110) can range from about 1.5 to 2.5 inches. In a preferred embodiment, first gripping handle 120 is about 2 inches in length. The next longest dimension of the first gripping handle 120 is about 1 to 2 inches, preferably about 1.5 inches in a direction perpendicular to the long axis of the strap 110. Finally, the first gripping handle 120 may have a third dimension that is perpendicular to both dimensions already described. The third dimension can range from about 0.5 to 1.5 inches, preferably about 1 inch.

The second gripping handle 130 can also range in size. Preferably, second gripping handle 130 is substantially round, with a diameter that ranges from about 1 to 2 inches. In a preferred embodiment, this diameter is about 1.5 inches. The second gripping handle 130 can also be partially flattened in one dimension. If so, the second gripping handle 130 can have a second dimension that ranges from about 0.75 to 1.25, preferably about 1 inch. However, the second gripping handle 130 can be essentially the same size and shape of the first gripping handle 120, as discussed.

The first gripping handle 120 is better seen in FIG. 4, which is a crosssectional view taken along the 4—4 line of FIG. 2. In this view, the substantially oval first gripping handle 120 is seen as having an upper portion 122 and a lower portion 124. Further, the first gripping handle 120 also has a rectangular aperture 112 suitable for accepting the strap 110. The aperture 112 can also be round to accept rope-like leads, which are commonly used. Similarly, FIG. 5 is a cross-sectional view of the second gripping handle 130, taken along the 5—5 line of FIG. 2. In this embodiment, the second gripping handle 130 is seen as having a rectangular aperture 137. Aperture 137 can also be round, to accommodate a round, rope-like leash.

FIGS. 6 and 7 are, respectively, top plan and bottom plan views of a second embodiment of the invention. As before, animal leash 600 includes a strap 610, a loop handle 640, lower strap portion 650 and a clip 660. While strap 610 and handle 640 are of similar construction to the animal leash 100 shown in FIGS. 1 through 5, the difference in this embodiment involves attachment of the first gripping handle 620 and second gripping handle 630 to strap 610. FIGS. 6 and 7 show the upper and lower portions (not illustrated) of the first gripping handle 620 secured to each other and to the strap via the use of a bolt or machine screw 626 and a nut 628. Alternatively, a rivet (not illustrated) could also be used.

FIGS. 8 through 11 illustrate a third embodiment of the animal leash 800 of the invention. Again, construction of the strap 810 and loop handle 840 are identical. In the embodiment pictured, first gripping handle 820 and second gripping handle 830 are shown attached to the strap 810 via snap fittings with aperture 812 being provided for the strap. Alternatively, a bolt and nut arrangement (as illustrated in FIGS. 6 and 7) could also be used. The second gripping handle 830, having an upper portion 833 and a lower portion 835, is also similar to those previously described. Instead, the first gripping handle 820 has a different shape. This embodiment of the first gripping handle 820 is more contoured than those illustrated in the previous Figures.

Figure 9:
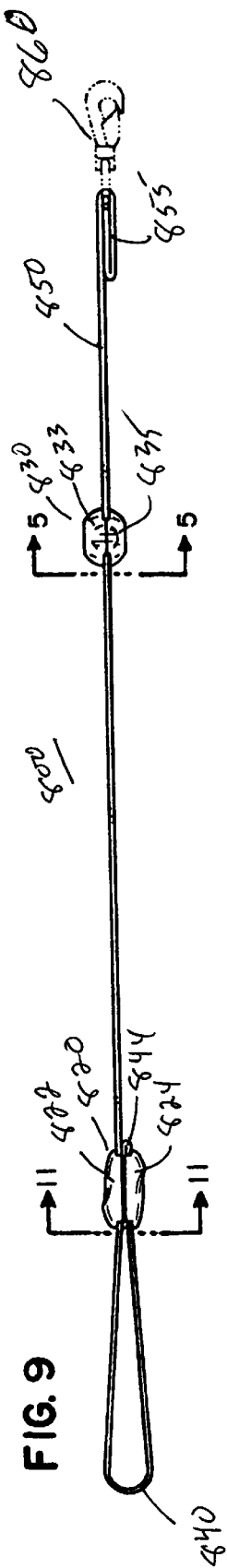
FIG. 9 is a side elevation of the animal leash shown in FIG. 8.
Figure 10:
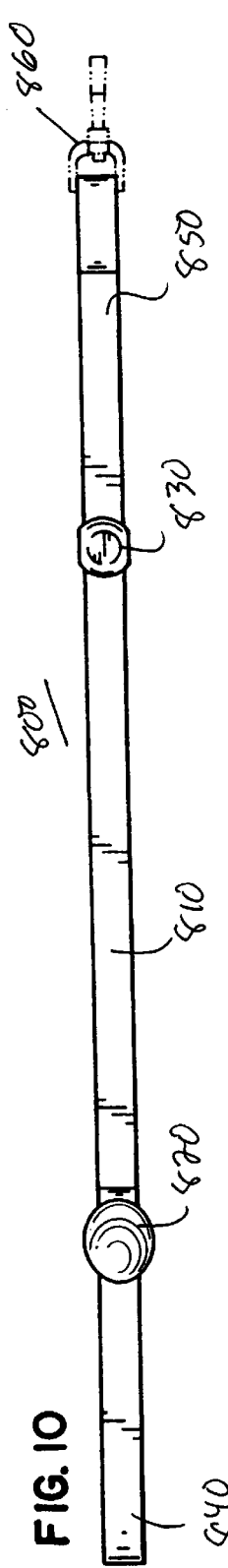
FIG. 10 is a bottom plan view of the animal leash shown in FIG. 8.
Figure 11:
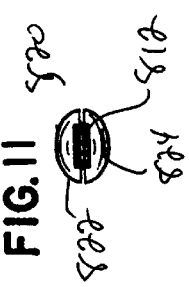
FIG. 11 is a cross-sectional view of the first or upper gripping handle, taken along the 11—11 line of FIG. 9.

This is best seen in FIG. 9, which is a cross-sectional view of the first gripping handle 820. Upper portion 822 and 824 are more directionally contoured to fit an average human hand. This first gripping handle 820 is considered to be an ergonomically contoured gripping handle. FIG. 11 shows a cross-sectional view of the gripping handle 820, taken along the 11—11 line of FIG. 9, in which upper portion 822 and lower portion 824 are connected to each other via snap connections. Of course, other attachment methods, as discussed, could also be used.

Figure 12:
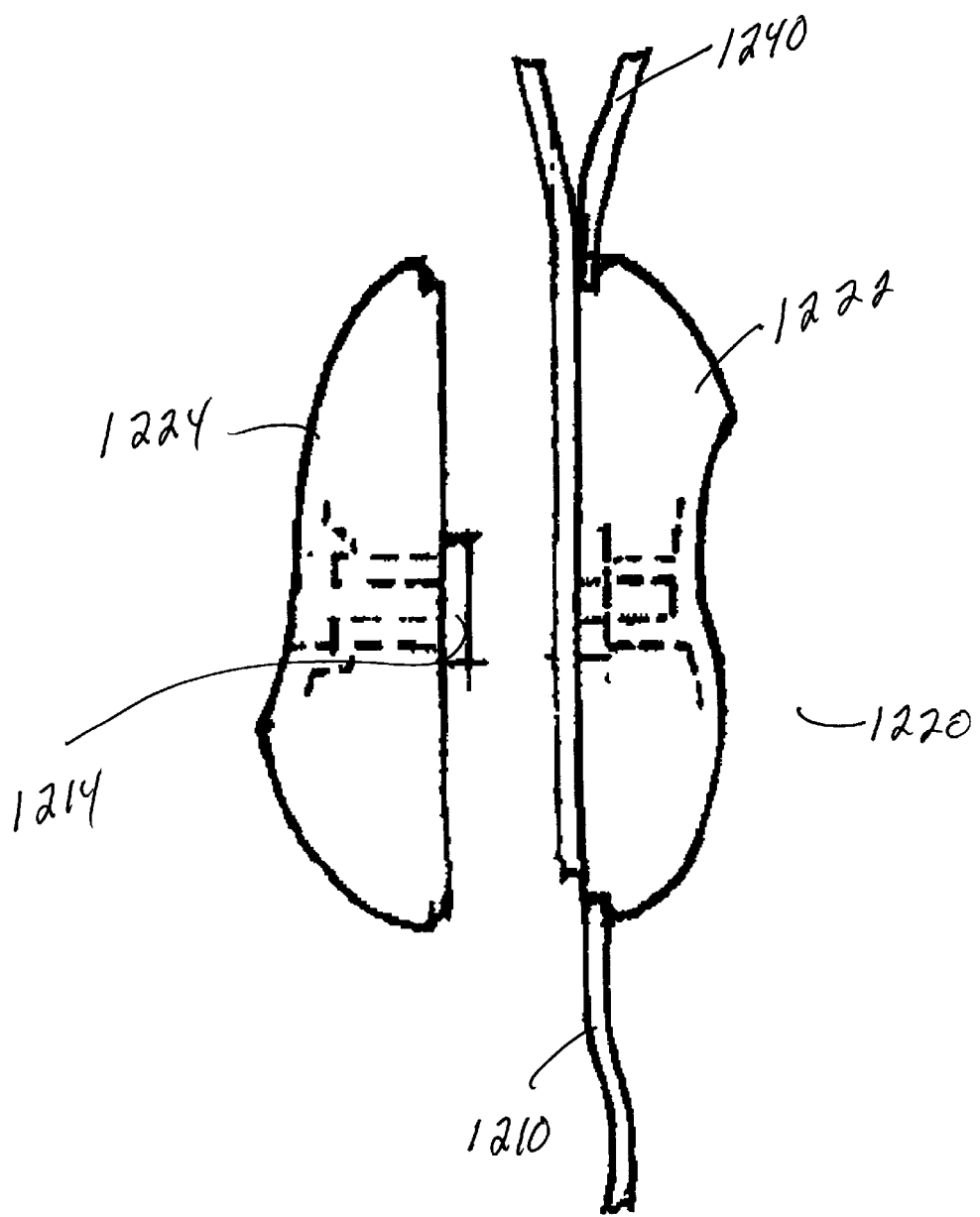
FIG. 12 is an exploded side view of another embodiment of the first gripping handle of the ergonomic animal leash of the invention.
Figure 13:
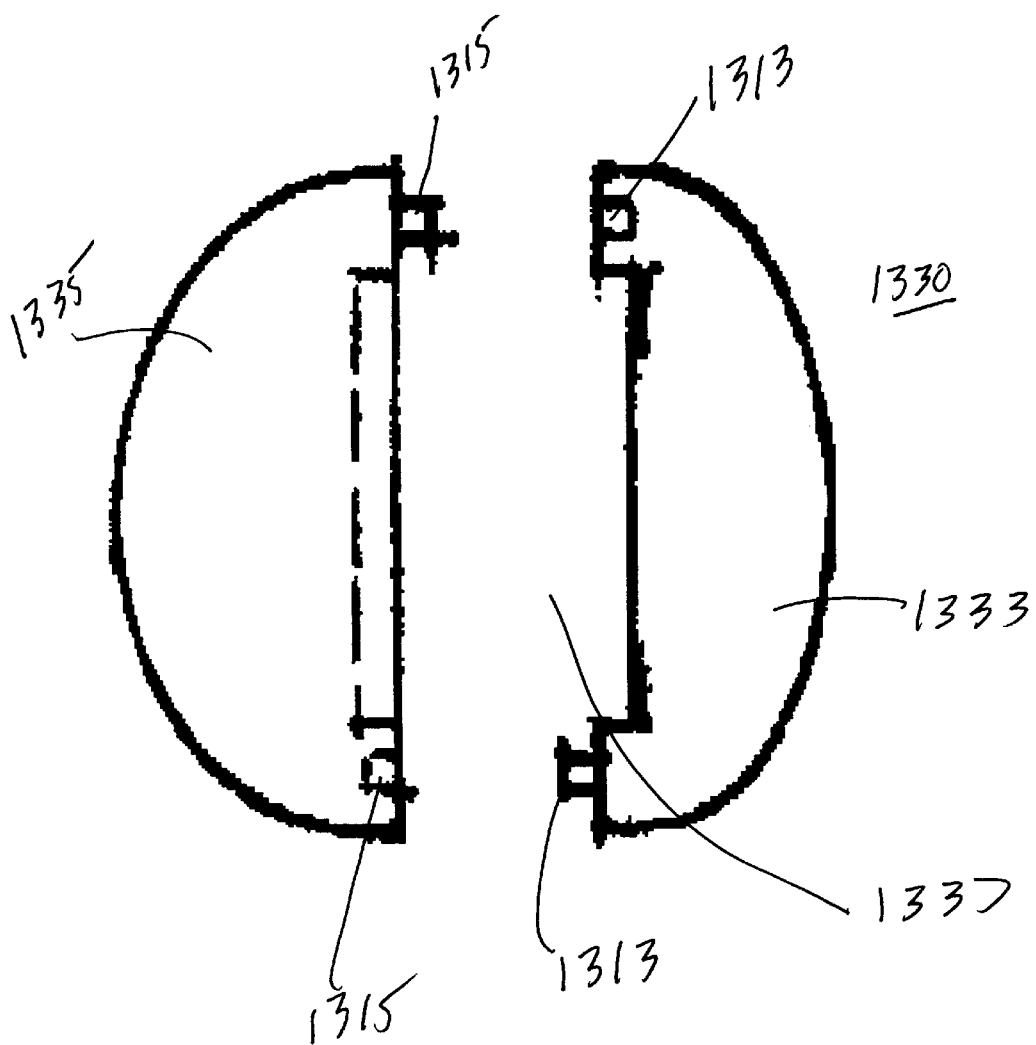
FIG. 13 is an exploded side view of another embodiment of the second gripping handle of the ergonomic animal leash of the invention.
Figure 14:
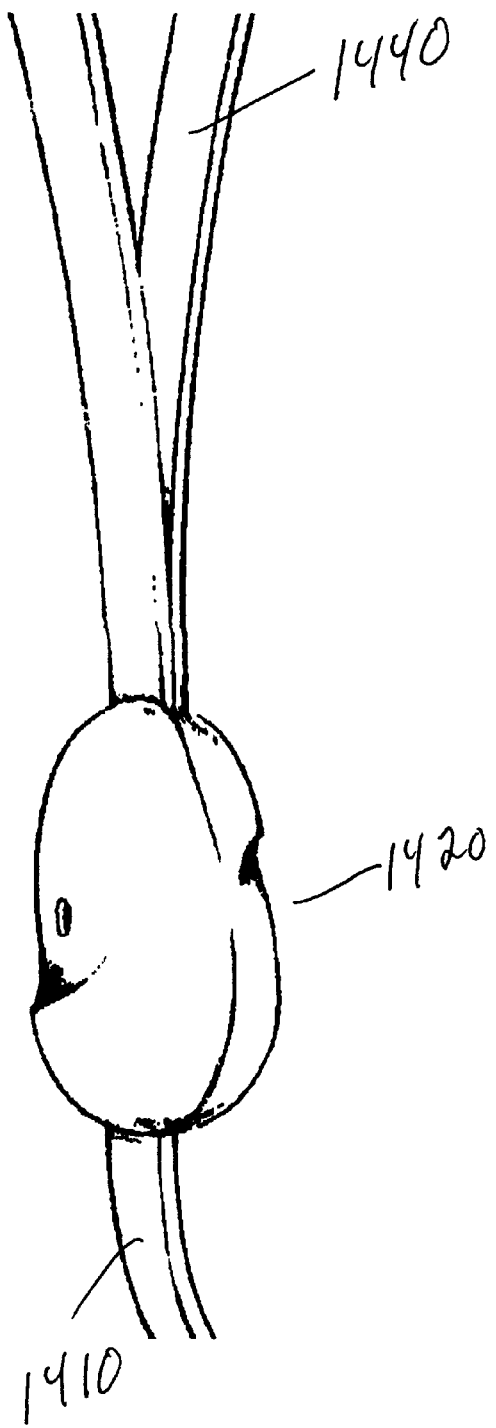
FIG. 14 is a perspective view of a portion of an animal leash bearing the first gripping handle shown in FIG. 12.

FIGS. 12 through 14 show a fourth embodiment of the ergonomic animal leash 1200 of the invention. FIG. 12 shows upper portion 1222 and identical but reversed lower portion 1224, which have a slightly different shape than that shown in FIGS. 7 through 11. Also seen is an aperture 1214 which is intended to receive a nut and bolt or rivet arrangement. FIG. 13 illustrates a second gripping handle 1330 in which upper portion 1333 and lower portion 1335 snap together via snaps 1313 and 1315. Finally, FIG. 14 illustrates the first gripping handle 1420 mounted on a portion of strap 1410, near a loop handle 1440.

The Figures here described individually show varying embodiments of gripping handle shape and attachment method. It is well within the scope of this invention to combine individual aspects of different embodiments. It is also within the scope of this invention to modify the size of the individual gripping handles. For example, an animal leash with slightly smaller gripping handles could be built for women, who typically have smaller hands than men. Conversely, an animal leash with slightly larger gripping handles could be built for men. Also, as different size dogs and other large animals require different gage leashes, the size of the gripping handles can be adjusted accordingly. For example, smaller gripping handles could be provided on a small gage handle. In addition, while the present leash is particularly useful for controlling animals, other fields of use may be possible. For example, the leash could be used as a strap for pulling wheeled luggage.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An ergonomic animal leash, comprising:

(a) an elongated body comprising a strap;

(b) a first end comprising a loop and further comprising a first substantially oval ergonomic gripping handle having a first dimension parallel to a long axis of the strap in a range of about 1.5 to 2.5 inches, a second dimension in a direction perpendicular to the first dimension of about 1 to 2 inches and a third dimension in a direction perpendicular to the first and second dimensions of about 0.5 to 1.5 inches, the first dimension being greater than the second and third dimensions;

(c) a second end comprising a second ergonomic gripping handle; the second end further comprising a clip suitable for attaching to an animal collar;

wherein the first ergonomic gripping handle and the second ergonomic gripping handle permit a user to easily and quickly grasp the leash and the first and second ergonomic handles arc dimensioned to fit within a user's hand.

2. The ergonomic animal leash of claim 1 in which the first ergonomic gripping handle is ergonomically contoured.

3. The ergonomic animal leash of claim 1 in which the second ergonomic gripping handle is substantially round.

4. The ergonomic animal leash of claim 1 wherein the first ergonomic gripping handle is attached to the strap by one selected from the group consisting of a snap fitting, adhesives, a fastening device that passes through the strap, or sonic sealing.

5. The ergonomic animal leash of claim 4 wherein the first ergonomic gripping handle is attached to the strap by a fastening device that passes through the strap.

6. The ergonomic animal leash of claim 1 wherein the second ergonomic gripping handle is attached to the strap by one selected from the group consisting of a snap fitting, adhesives, a fastening device that passes through the strap, or sonic sealing.

7. The ergonomic animal leash of claim 6 wherein the second ergonomic gripping handle is attached to the strap by a fastening device that passes through the strap.

8. An ergonomic animal leash according to claim 1, wherein the second ergonomic gripping handle is substantially round and has a diameter of about 1 to 2 inches.

9. An ergonomic animal leach according to claim 8, wherein the second ergonomic gripping handle is partially flattened in one direction and has a second dimension of about 0.75 to 1.25 inches.

* * * * *